US007974265B2

(12) United States Patent
Cheng et al.

(10) Patent No.: US 7,974,265 B2
(45) Date of Patent: Jul. 5, 2011

(54) REMOTE PARKING METER AUDITING MODULE

(75) Inventors: Shih Yu Cheng, Berkeley, CA (US); Jan Mark Noworolski, Burlingame, CA (US); Tod Dykstra, San Francisco, CA (US); Scott Dykstra, San Francisco, CA (US); Naim Busek, Oakland, CA (US)

(73) Assignee: Streetline Networks, San Francisco, CA (US)

( * ) Notice: Subject to any disclaimer, the term of this patent is extended or adjusted under 35 U.S.C. 154(b) by 553 days.

(21) Appl. No.: 11/728,716

(22) Filed: Mar. 26, 2007

(65) Prior Publication Data

US 2008/0238715 A1 Oct. 2, 2008

(51) Int. Cl.
*H04L 12/28* (2006.01)

(52) U.S. Cl. .................................................... 370/351

(58) Field of Classification Search .................. 370/351, 370/422, 406, 405, 410, 414, 539, 93, 21, 370/200, 317, 352, 400; 705/13, 26, 418, 705/22; 709/220, 221, 222; 379/144, 143; 455/422, 406, 426, 550, 522, 564, 405, 410, 455/414; 340/907, 932, 870, 539; 375/240; 348/143

See application file for complete search history.

(56) References Cited

U.S. PATENT DOCUMENTS

| | | | | |
|---|---|---|---|---|
| 5,432,508 | A * | 7/1995 | Jackson | 340/932.2 |
| 5,454,461 | A * | 10/1995 | Jacobs | 194/200 |
| 5,570,771 | A | 11/1996 | Jacobs | |
| 5,573,099 | A * | 11/1996 | Church et al. | 194/317 |
| 6,996,086 | B2 | 2/2006 | Wolfe et al. | |
| 7,065,376 | B2 | 6/2006 | Wolman et al. | |
| 7,103,511 | B2 | 9/2006 | Petite | |
| 2002/0176390 | A1 | 11/2002 | Sparr et al. | |
| 2004/0225740 | A1 | 11/2004 | Klemba et al. | |
| 2005/0104723 | A1 | 5/2005 | Mandy | |
| 2005/0280555 | A1 | 12/2005 | Warner, IV | |
| 2006/0095331 | A1 * | 5/2006 | O'Malley et al. | 705/22 |
| 2007/0037554 | A1 * | 2/2007 | Freeny | 455/410 |
| 2007/0082707 | A1 * | 4/2007 | Flynt et al. | 455/564 |
| 2007/0096943 | A1 * | 5/2007 | Arnold et al. | 340/907 |
| 2008/0291054 | A1 * | 11/2008 | Groft | 340/932.2 |

OTHER PUBLICATIONS

Kragg et al., Thomas. Wireless Mesh Networking. O'Reilly Network, Jan. 1, 2004. http://www.oreillynet.com/pub/a/wireless/2004/01/22/wirelessmesh.

* cited by examiner

*Primary Examiner* — Pankaj Kumar
*Assistant Examiner* — Prenell P Jones
(74) *Attorney, Agent, or Firm* — Lumen Patent Firm

(57) ABSTRACT

A remote parking meter monitoring system is provided. The system has a plurality of radio transceivers. Each transceiver communicates with at least one other transceiver within a transceiver communication region. The transceivers are integrated to parking meters. A separate aggregate point has a transceiver and a communication network that is connected to a computer. The aggregate point communicates with at least one proximal transceiver and communicates to the computer through the network. The system has a mesh communication arrangement, and a signal routing architecture, where the information is communicated along any path of adjacent communication regions. The computer is able to communicate information through the network to the aggregate point, and the aggregate point transceiver sends the information to the proximal transceiver. The information is communicated to any one of the transceivers in the mesh using the routing architecture by communicating the signal through any path between adjacent communication regions.

19 Claims, 5 Drawing Sheets

REMOTE PARKING METER AUDITING MODULE

FIELD OF THE INVENTION

The invention relates generally to parking meter automation. More particularly, the invention relates to parking meter auditing and maintenance that is automated using a mesh network.

BACKGROUND

In the past, parking meters were audited by recording their functional status and counting the coins collected in each meter vault during coin collection runs. Because meter auditing is an error-prone and labor-intensive process, it is seldom performed. When an audit is performed, it rarely includes payment information on a specific meter. In fact, most parking auditing has only information related to gross earning data of several meters in a region, measured in city blocks for example, and spanning over periods as long as several weeks. As a result, coin theft, meter malfunctions, vandalism, and regulation compliance are often poorly managed because such events cannot be detected in a timely and accurate manner. The introduction of electronically auditable parking meters has partially addressed these problems by making it possible to record payment transaction, failure modes, and device status within the meter's internal memory. This information is then directly downloaded from each parking meter using a handheld device operated by meter service personnel. Depending on a parking management personnel budget, auditing intervals can range from once a week to once every several months.

To improve man-hour efficiency related to data meter information retrieval, some electronically auditable parking meters have been equipped with short-range infrared wireless interfaces that enable data to be downloaded without opening the meter housing. However, the data collection still requires personnel to be dispatched to the field, and the opportunity cost of delayed notification of meter malfunctions continues to take a significant toll on parking revenue. A trade-off still exists between timely detection of malfunctions versus the high labor costs of frequently sending personnel into the field to detect such malfunctions.

In an attempt to address meter malfunctions, parking meters have been equipped with a radio transceiver and cell phone communication devices, where the radio transceiver sends and receives fixed range beacon signals to an adjacent transceiver-equipped parking meter. In the event the meter does not hear back from an adjacent meter, a call through the cellular network is placed from the operative meter to report a non-communicative adjacent meter. A service personnel is then dispatched to find the if one parking meter has been damaged or removed, or if that the transceiver may be malfunctioning. Equipping each parking meter with a cellular communication device is known to be expensive and requires relatively high power demands, where it is desirable to have each meter operate for extended lengths of time without battery replacement or recharge. Additionally, it is found that for this system to be viable, it is necessary to have cellular communication with all of the parking meters, where it becomes prohibitively expensive and difficult in mountainous regions. Further, because the transceiver signal is a simple beacon signal, the transceivers can only determine if there is a beacon signal coming from an adjacent transceiver, thus having very limited utility with respect to the needs of comprehensive parking meter auditing.

Accordingly, there is a need to develop real-time remote parking meter auditing that automatically and remotely audits the meters with timely detection of malfunctions to provide dramatic labor savings. Unfortunately, current wireless systems are power-hungry, expensive, do not scale well as the number of devices in the network increases, are unreliable in urban environments, or have insufficient range. As a result, despite a myriad of wireless options, no parking meter system has a fully automated remote auditing system that can operate over extended periods under very low power.

SUMMARY OF THE INVENTION

The present invention provides a remote parking meter monitoring system having a plurality of radio transceivers that transmit and receive information radio signals with at least one other transceiver within a communication region of the transceiver, where the transceivers are integrated to parking meters. The remote parking meter monitoring system further has an aggregate point that is removed from the parking meters, where the aggregate point has an aggregate point radio transceiver and a communication network connected to a computer. The aggregate point radio transceiver transmits and receives the information radio signals to at least one proximal parking meter transceiver within the communication region, and the aggregate point further communicates to the computer through the communication network. Additionally, the remote parking meter monitoring system has a mesh communication arrangement of the radio transceivers, and a signal routing architecture in the transceivers. One of the transceivers communicates the information to at least one other transceiver located within its communication region, where the information is communicated to the proximal transceiver along any path of adjacent communication regions across the mesh using the routing architecture. The information is communicated to the aggregate point transceiver and the aggregate point communicates the information to the computer through the network. The computer is able to communicate information through the network to the aggregate point, and the aggregate point transceiver sends the information to the proximal transceiver. The information is communicated to any one of the transceivers in the mesh using the routing architecture by communicating the signal through any path between adjacent communication regions.

In one aspect of the invention, the communication region includes a distance at least to one adjacent transceiver for low-power operation.

In another aspect, the parking meter has an analog to digital and digital to analog signal converter in its transceiver to translate digital information into radio waves and back to digital information on the receiving transceiver. Additionally, the aggregate point has an analog to digital and digital to analog signal converter for the same purpose.

In one aspect of the invention, the path can be a shortest path. And in another aspect, the path is a path of lowest power output from the transceivers.

In another aspect of the invention, the information between the transceivers and the aggregate point can include meter malfunction status, meter payment status, transceiver malfunction status, coin-drop notification, meter battery status, meter time and coin box collection notification.

In another aspect of the invention, the information communicated from the aggregate point to the transceivers can include a command to reset a meter, set meter time, set meter rate, add payment, subtract payment, reset meter audit information, request meter maintenance information and shutdown meter.

In another aspect of the invention, the mesh communication arrangement can be a multi-hopping linear arrangement or a multi-hopping grid arrangement.

In one aspect of the invention, the communication network can be a cellular network, a public switched telephone network, cable, DSL, WiFi, optic fiber, serial cable, or any general digital packet radio.

In another aspect of the invention, the radio transceiver is an infrared transceiver.

In another aspect of the invention, the transceiver power output is according to a distance to a closest operative transceiver. Further, the transceiver power output can be set by a command from the computer.

The invention further includes a method of remote monitoring of parking meters by providing a plurality of parking meters and providing a plurality of radio transceivers, where the radio transceiver transmits and receives information radio signals with at least one other transceiver within a communication region of the transceiver. The transceivers are integrated to the parking meters. The method of remote monitoring of parking meters further includes providing an aggregate point that is removed from the parking meter, providing an aggregate point radio transceiver attached to the aggregate point, providing a communication network attached to the aggregate point and providing a computer at a remote location. The communication network is connected to the computer, and the aggregate point radio transceiver transmits and receives the information radio signals to at least one proximal parking meter transceiver within the communication region, where the aggregate point communicates to the computer. The method of remote monitoring of parking meters further includes providing a mesh communication arrangement of the radio transceivers and providing a signal routing architecture between the transceivers, where one of the transceivers communicates the information to at least one other transceiver located within the region. The information is communicated to the proximal transceiver along any path of adjacent communication regions across the mesh and using the routing architecture, where the information is communicated to the aggregate point transceiver and the aggregate point communicates the information to the computer through the network. Additionally, the computer communicates information through the network to the aggregate point and the aggregate point transceiver sends the information to the proximal transceiver, where the information is communicated to any one of the transceivers in the mesh using the routing architecture by communicating the signal through any path between adjacent communication regions.

Some key advantages include very low power requirements and the ability to transfer date reliably across the mesh network. The low power allows the transceivers to share a battery with the parking meter without significantly reducing its lifetime. Another defining advantage of this invention is that the system does not require any wireless infrastructure. The network scales naturally as more transceivers are added because each one also functions as a wireless mesh network router. The diversity of routing paths in the mesh network provides many paths for a given piece of information to travel through the network, hence increasing the reliability of data delivery compared to other wireless networks. The diversity of routing paths is particularly important in urban environments using the low-power transceiver because the low-power signals are easily blocked by large objects such as trucks, buses, or temporary structures. The information must be able to route around the obstacle in order to achieve the data reliability.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides accurate and timely reporting of parking meter information in a simple module that can be upgraded in the field and may either be applied to existing parking meters, or be deployed with the installation of new parking meters. The invention enables parking management that can instantly detect meter malfunctions, be configured to actuate the meters in real-time, provide resetting of the meter when the meter malfunctions, or change the parking rate remotely, to name a few. With real-time remote auditing and remote actuation capability, meter downtime can be minimized, and significant labor savings can be realized.

The invention is a wireless mesh network transceiver, that functions similarity to an multiple internet routers connected in a peer-to-peer fashion. Information can travel from one mesh transceiver to another by passing through several other mesh transceivers which possess enough intelligence to route the information correctly toward the intended destination. The mesh transceiver is effectively the wireless communication infrastructure. The wireless mesh network is an ideal networking solution for parking meters because the consistent spacing of parking meters lends itself well to redundant mesh networks. The network can support other valuable applications by carrying data from a variety of other device types, delivering information related to locations of car crashes or gunshots, for example, or providing remote metering of electricity, gas and water systems. Because each device is a wireless router, the network expands naturally as more devices are added.

Figure 1:
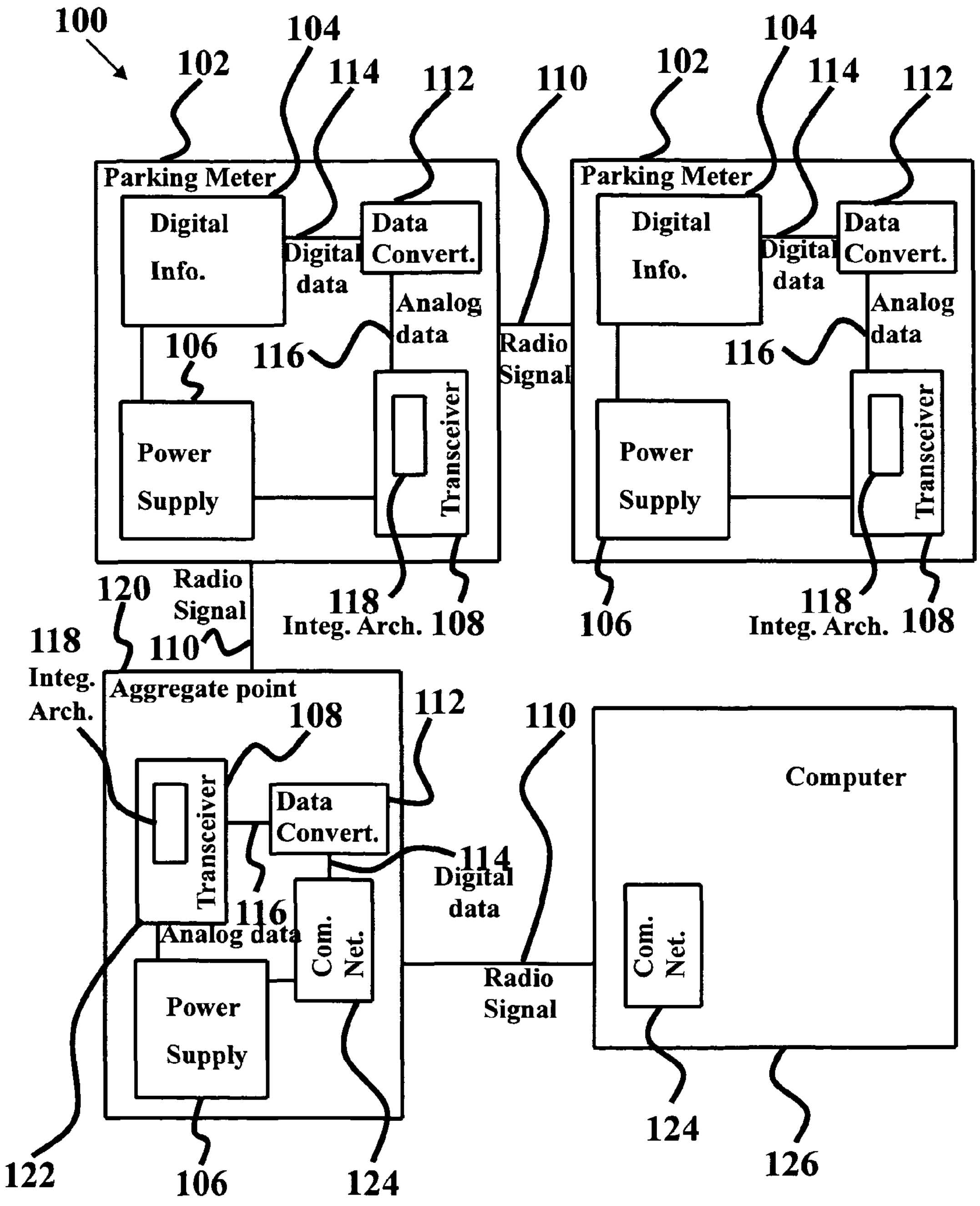
FIG. 1 shows the parking meter monitoring system according to the present invention.

Referring to the drawings, FIG. 1 shows the parking meter monitoring system 100 according to one embodiment of the invention. Shown are a at least two electronic parking meters 102 having digital parking meter information 104, where the parking meter has an internal power supply 106, such as a battery. Further shown is a radio transceiver 108 integrated to the parking meters 102, where the transceivers 108 transmit and receive information radio signals 110 with at least one other transceiver 108 having adjacent communication regions (see FIG. 2) of the transceivers 108. In one aspect of the invention, the radio transceiver 102 can be an infrared transceiver. Here the transceiver 108 is shown to be connected to the power supply 106 of the parking meter 102. Also shown is a data converter 112 that converts digital parking meter information 114 to analog transceiver data 116, and analog transceiver data 116 to digital parking meter data 114. The transceiver 108 has an integrated routing architecture 118. The remote parking meter monitoring system 100 further has an aggregate point 120 that is removed from the parking meters 102, where the aggregate point 120 has an aggregate point radio transceiver 122 and a communication network 124. The communication network 124 is connected to a computer 126. The aggregate point radio transceiver 122 transmits and receives the information radio signals 110 with at least one proximal parking meter transceiver 108 within the communication region (see FIG. 2), and the aggregate point 120 further communicates to the computer 126 through the communication network 124. Additionally, the remote parking meter monitoring system 100 has a mesh communication arrangement of the radio transceivers (see FIG. 2), for use with the signal routing architecture 118 in the transceivers 108. One of the transceivers 102 communicates the information 110 with at least one transceiver 102 within the region (see FIG. 2), where the information 110 is communicated along any path of adjacent communication regions across the mesh (see FIG. 2), using the routing architecture 118, to the transceiver 102 nearest the aggregate point 120. The information 110 is communicated to the aggregate point transceiver 122, where the aggregate point 120 communicates the information to the computer 126 through the network 124. The computer 126 is able to communicate information 110 through the network 124 to the aggregate point 120, and the aggregate point transceiver 122 sends the information 110 to the nearest transceiver 108. The information is communicated to any one of the transceivers 108 in the mesh (see FIG. 2) using the routing architecture 118 by communicating the signal through any path between adjacent communication regions (see FIG. 2).

The information between the transceivers 108 and the aggregate point 120 can include meter malfunction status, meter payment status, transceiver malfunction status, coin-drop notification, meter battery status, meter time and coin box collection notification.

Further, the information communicated from the aggregate point 120 to the transceivers 108 can include a command to reset a meter, set meter time, set meter rate, add payment, subtract payment, reset meter audit information, request meter maintenance information and shutdown meter.

Figure 2:
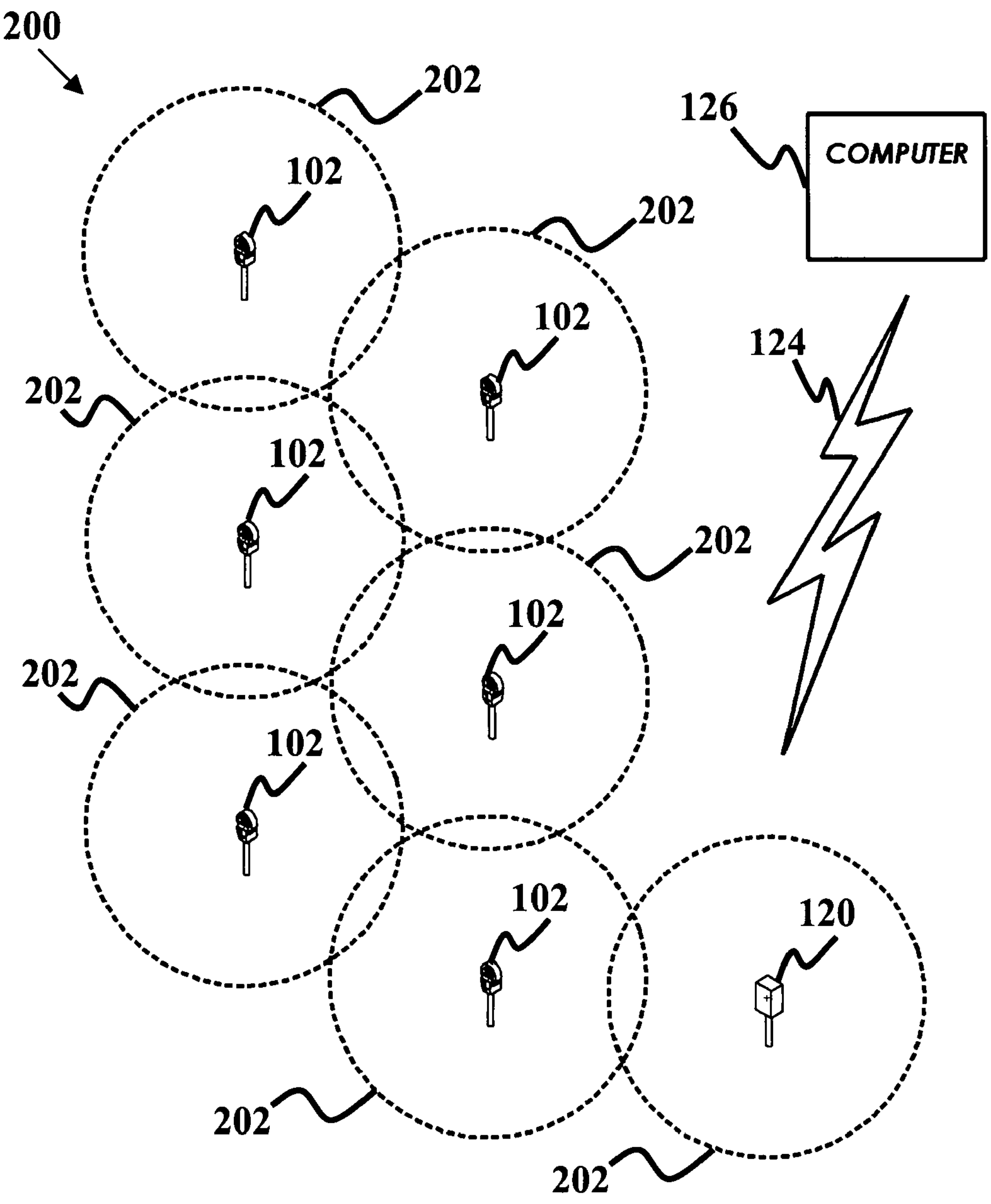
FIG. 2 shows a mesh network the parking meter monitoring system according to the present invention.
Figure 3:
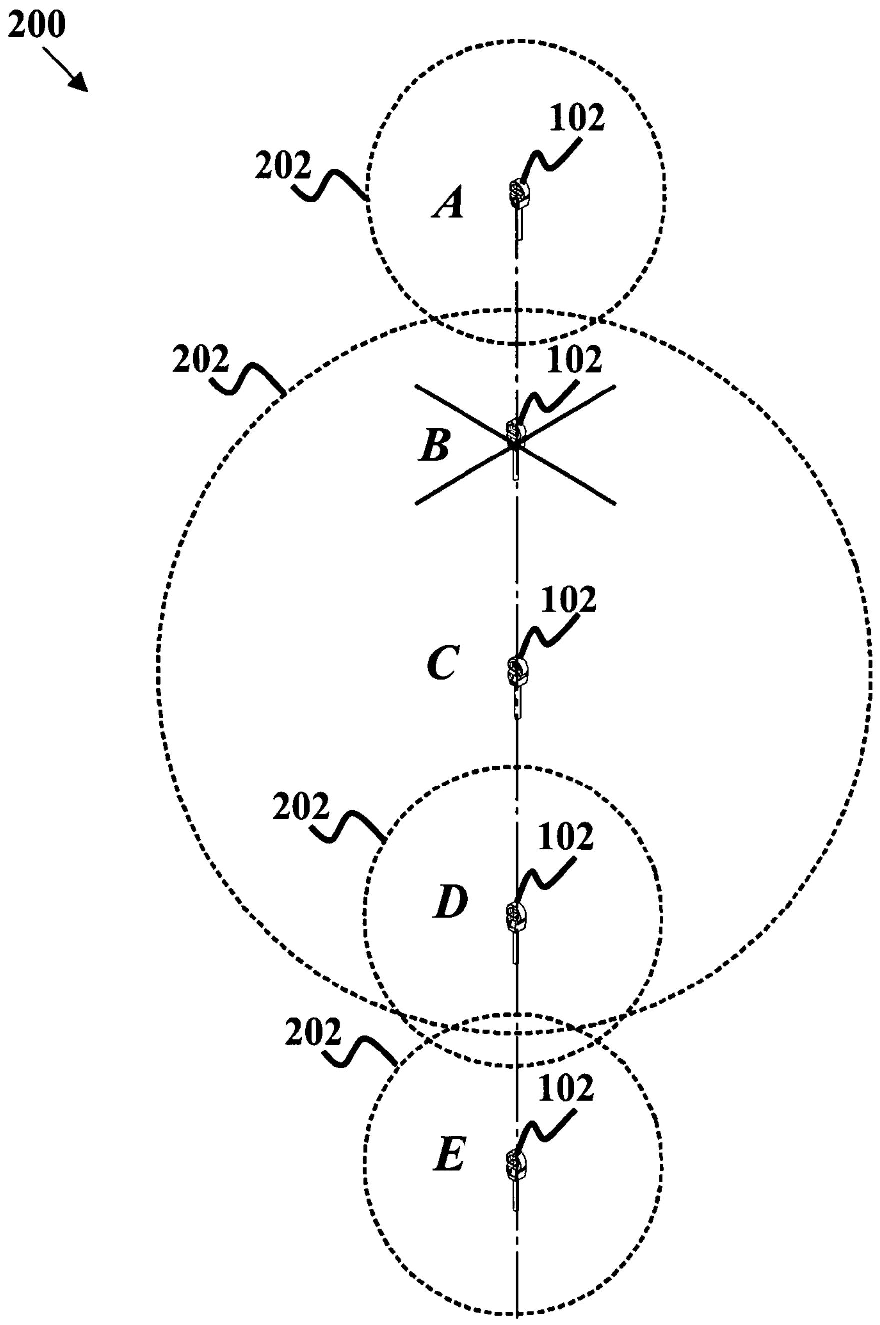
FIG. 3 shows an expanded communication region with a multi-hopping linear segment of a mesh network according to the present invention.
Figure 4:
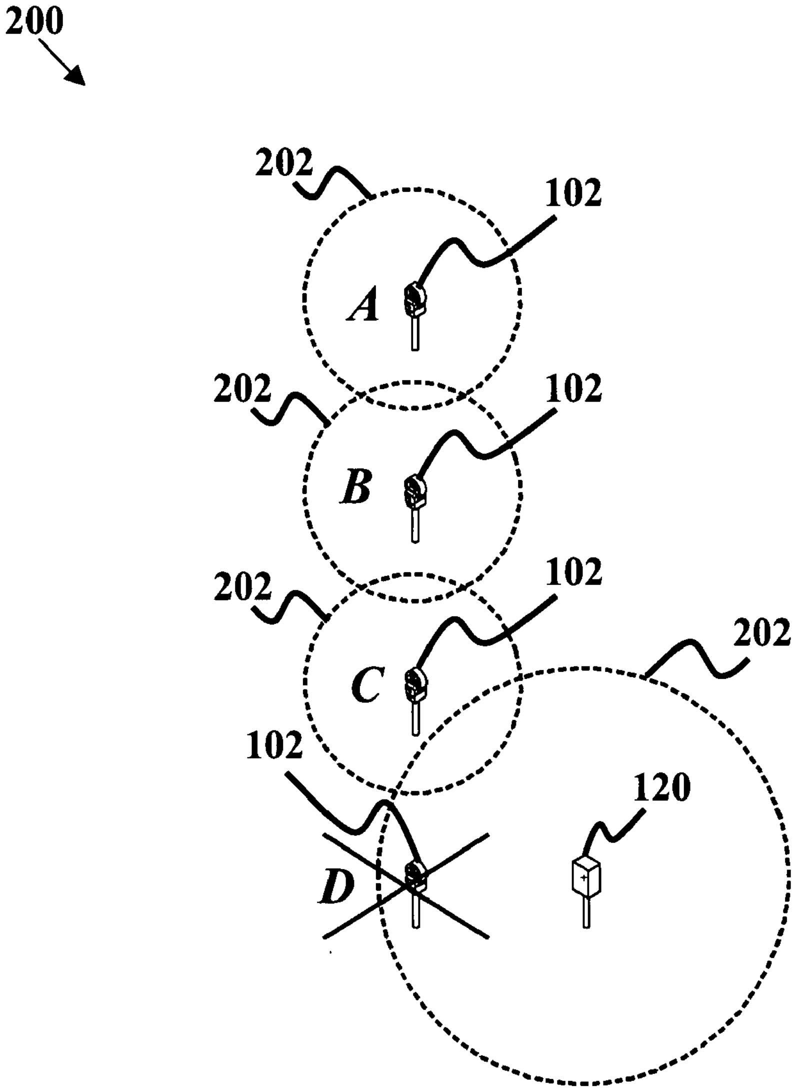
FIG. 4 shows an expanded communication region with a multi-hopping linear segment of a mesh network with an aggregate point according to the present invention.

In FIGS. 2-4, to simplify the drawings, dashed circles represent communication regions of the transceivers 108. Overlapping transmission regions represent a connected communication path between adjacent transceivers 108. Therefore, it is understood that the transceivers 108 can communicate with each other when the circles are overlapping.

FIG. 2 shows the mesh network 200 according to one embodiment of the invention, where shown is a multi-hopping grid arrangement. Each transceiver 108 integrated to the parking meter 102 has a communication region 202, where the communication region 202 includes a distance at least to one adjacent transceiver 102 for low-power operation. As shown, the communication regions 202 can be in communication with multiple transceivers 108, allowing for many possible paths for the information 110 to route through the mesh network 200. In a circumstance that one or more of the transceivers 108 or parking meters 102 become inoperative or are destroyed, the transceivers 108 can be configured to expand the communication region 202 to communicate with another transceiver 108 further away than an adjacent transceiver 108. In one embodiment of the invention, the communication network 124 can be a cellular network, a public switched telephone network, cable, DSL, WiFi, optic fiber, serial cable or any general digital packet radio.

In one embodiment of the invention, FIG. 3 shows part of a mesh network 200 that is a linear mesh segment, such as a multi-hopping linear arrangement. Shown as an example, are five parking meters 102 in series {A, B, C, D, and E), where the transceiver 108 in position (B) is not operative. In this example, either the transceiver 108 in position (A) or the transceiver 108 in position (C) can increase the transmission region 202 to reconnect the mesh network 200, where as shown in FIG. 3, the transceiver 108 in position (C) has increased its transmission power output to expand its transmission region 202 to span beyond the parking meter 120 in position (B) and communicate with the parking meter 102 in position (A). The increase in transmission power output can be done automatically by the transceivers 108 having a seek and find function incorporated there in, or the increase can be controlled using the computer 126.

In one aspect, the transceivers 108 can have a feature that, automatically or by command from the computer 126, reduces their transmission power output until no signal is found to determine a minimum transmission power requirement for communicating with adjacent transceivers 108, as a power optimization feature. This aspect is also useful after inoperative transceivers 108 are made operative again.

In another embodiment of the invention, FIG. 4 shows part of the mesh network 200 having a linear segment of parking meters 102 (A, B, C, and D) and an aggregate point 120 positioned away from the parking meters 102. In this example, the transceiver 102 in position (D) is shown to be inoperative. In this embodiment, the aggregate point transceiver 122 increase its transmission power and expand its communication region 202 to reach the closest region 202 of an operative transceiver 108. Similarly, but not shown, the transceiver 108 in position (C) could expand its communication region 202 to reach the aggregate point 120.

According to the embodiments above, the communication path can be a shortest path, or it can be a path of lowest power output from the transceivers 108, where the multi-hopping linear arrangement or a multi-hopping grid arrangement may be use in part, in tandem or in entirety.

Figure 5:
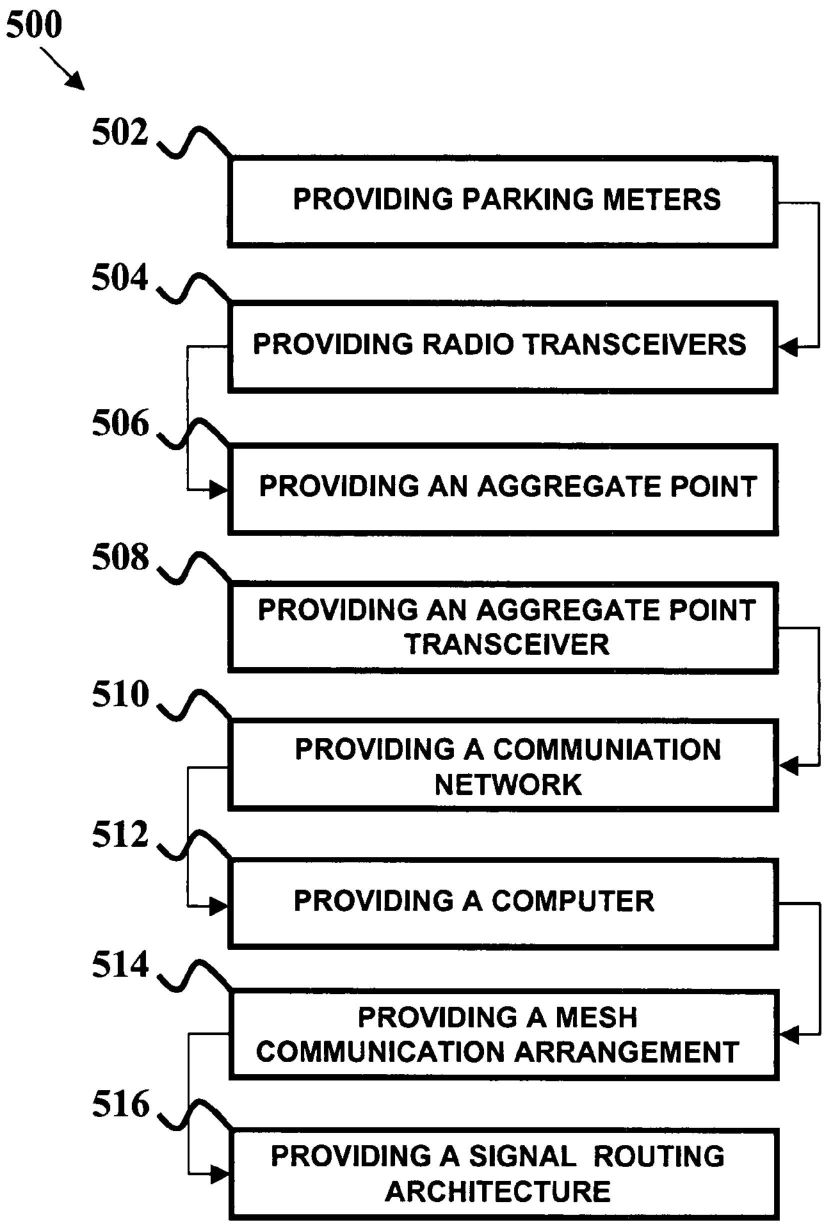
FIG. 5 shows a remote monitoring of parking meters method according to the present invention.

The invention further includes a remote monitoring of parking meters method 500 as shown in FIG. 5. The method 500 includes providing a plurality of parking meters 502 and providing a plurality of radio transceivers 504, where the radio transceiver transmits and receives information radio signals with at least one other transceiver within a communication region of the transceiver. The transceivers are integrated to the parking meters. The method of remote monitoring of parking meters further includes providing an aggregate point 506 that is removed from the parking meter, providing an aggregate point radio transceiver 508 attached to the aggregate point, providing a communication network 510 attached to the aggregate point and providing a computer 512 at a remote location. The communication network is connected to the computer, and the aggregate point radio transceiver transmits and receives the information radio signals to at least one proximal parking meter transceiver within the communication region, where the aggregate point communicates to the computer. The method of remote monitoring of parking meters 500 further includes providing a mesh communication arrangement 514 of the radio transceivers and providing a signal routing architecture 516 between the transceivers, where one of the transceivers communicates information to at least one other transceiver located within the region. The information is communicated to the proximal transceiver along any path of adjacent communication regions across the mesh and using the routing architecture, where the information is communicated to the aggregate point transceiver and the aggregate point communicates the information to the computer through the network. Additionally, the computer communicates information through the network to the aggregate point and the aggregate point transceiver sends the information to the proximal transceiver, where the information is communicated to any one of the transceivers in the mesh using the routing architecture by communicating the signal through any path between adjacent communication regions.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the aggregate point may be combined in the parking meter in one embodiment. Additionally, the aggregate point may be combined with the computer in another embodiment. Further the aggregate point and the computer may be combined with the parking meter in yet another variation of the embodiments.

All such variations are considered to be within the scope and spirit of the present invention as defined by the following claims and their legal equivalents.

What is claimed:

1. A remote parking meter monitoring system comprising:

a. a plurality of radio transceivers, wherein said radio transceiver transmits and receives information radio signals with at least one other said transceiver within a communication region of said transceiver, wherein said transceivers are integrated to parking meters;

b. an aggregate point that is removed from said parking meter, wherein said aggregate point comprises an aggregate point radio transceiver and a communication network connected to a computer, wherein said aggregate point radio transceiver transmits and receives said information radio signals to at least one proximal parking meter transceiver within said communication region, and wherein said aggregate point communicates to said computer;

c. a mesh communication arrangement of said radio transceivers; and d. a signal routing architecture in said transceivers, wherein one of said transceivers communicates said information to at least one other said transceiver located within said region, wherein said information is communicated to said proximal transceiver along any path of adjacent said communication regions across said mesh and using said routing architecture, whereas said information is communicated to said aggregate point transceiver and said aggregate point communicates said information to said computer through said network, and wherein said computer communicates said information through said network to said aggregate point and said aggregate point transceiver sends said information to said proximal transceiver, wherein said information is communicated to any one of said transceivers in said mesh using said routing architecture by communicating said signal through any path between adjacent said communication regions, wherein when at least one said transceiver is inoperative at least one said transceiver that is proximal to said inoperative transceiver is configurable to expand said communication region to communicate with another transceiver located at a distance further than said inoperative transceiver.

2. The parking meter monitoring system of claim 1, wherein said communication region comprises a distance at least to one adjacent said transceiver for low-power operation.

3. The parking meter monitoring system of claim 1, wherein said parking meter further comprises an analog to digital and digital to analog signal converter.

4. The parking meter monitoring system of claim 1, wherein said aggregate point further comprises an analog to digital and digital to analog signal converter.

5. The parking meter monitoring system of claim 1, wherein said path is a shortest path.

6. The parking meter monitoring system of claim 1, wherein said path is a path of lowest power output from said transceivers.

7. The parking meter monitoring system of claim 1, wherein said information between said transceivers and said aggregate point comprises:

a. meter malfunction status;
b. meter payment status;
c. transceiver malfunction status;
d. coin-drop notification;
e. meter battery status;
f. meter time;
g. coin box collection notification; and
h. inoperative transceiver status.

8. The parking meter monitoring system of claim 1, wherein said information communicated from said aggregate point to said transceivers comprises:

a. reset meter;
b. set meter time;
c. set meter rate;
d. add payment;
e. subtract payment;
f. reset meter audit information;
g. request meter maintenance information;
h. shutdown meter; and
i. inoperative transceiver status.

9. The parking meter monitoring system of claim 1, wherein said mesh communication arrangement is selected from a group consisting of a multi-hopping linear arrangement and a multi-hopping grid arrangement.

10. The parking meter monitoring system of claim 1, wherein said communication network is selected from a group consisting of a cellular network, a public switched telephone network, cable, DSL, WiFi, optic fiber, serial cable and any general digital packet radio.

11. The parking meter monitoring system of claim 1, wherein said radio transceiver is an infrared transceiver.

12. The parking meter monitoring system of claim 1, wherein said radio transceiver has a variable transmission power output.

13. The parking meter monitoring system of claim 12, wherein said transmission power output is according to a distance to a closest operative said transceiver.

14. The parking meter monitoring system of claim 12, wherein said transmission power output is according a command from said computer.

15. A method of remote monitoring of parking meters comprising:

a. providing a plurality of parking meters;

b. providing a plurality of radio transceivers, wherein said radio transceiver transmits and receives information radio signals with at least one other said transceiver within a communication region of said transceiver, wherein said transceivers are integrated to said parking meters;

c. providing an aggregate point that is removed from said parking meter;

d. providing an aggregate point radio transceiver attached to said aggregate point;

e. providing a communication network attached to said aggregate point;

f. providing a computer at a remote location, wherein said communication network is connected to said computer, wherein said aggregate point radio transceiver transmits and receives said information radio signals to at least one proximal parking meter transceiver within said communication region, and wherein said aggregate point communicates to said computer;

g. providing a mesh communication arrangement of said radio transceivers; and h. providing a signal routing architecture between said transceivers, wherein one of said transceivers communicates said information to at least one other said transceiver located within said region, wherein said information is communicated to said proximal transceiver along any path of adjacent said communication regions across said mesh and using said routing architecture, whereas said information is communicated to said aggregate point transceiver and said aggregate point communicates said information to said computer through said network, and wherein said computer communicates said information through said network to said aggregate point and said aggregate point transceiver sends said information to said proximal transceiver, wherein said information is communicated to any one of said transceivers in said mesh using said routing architecture by communicating said signal through any path between adjacent said communication regions, wherein when at least one said transceiver is inoperative at least one said transceiver that is proximal to said inoperative transceiver is configurable to expand said communication region to communicate with another transceiver located at a distance further than said inoperative transceiver.

16. The parking meter monitoring system of claim 1, wherein said transceiver communication region is controlled by said computer.

17. The parking meter monitoring system of claim 1, wherein said transmission communication region is reduced until no signal is found to determine a minimum transmission communication region requirement for communicating with adjacent transceivers after said at least one inoperative transceiver is made operative again.

18. The parking meter monitoring system of claim 15, wherein said transceiver communication region increase is controlled by said computer.

19. The parking meter monitoring system of claim 15, wherein said transmission communication region is reduced until no signal is found to determine a minimum transmission communication region requirement for communicating with adjacent transceivers after said at least one inoperative transceiver is made operative again.

* * * * *